United States Patent
Nakayama et al.

(10) Patent No.: US 11,654,837 B2
(45) Date of Patent: May 23, 2023

(54) SENSOR FOR AUTONOMOUSLY MOVABLE MOVING BODY

(71) Applicant: HONDA MOTOR CO., LTD., Tokyo (JP)

(72) Inventors: Shingo Nakayama, Tokyo (JP); Yuki Kizumi, Saitama (JP); Tadahiro Matori, Tokyo (JP); Shohei Iwamoto, Tokyo (JP); Tohko Nakai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 17/446,028

(22) Filed: Aug. 26, 2021

(65) Prior Publication Data
US 2022/0063514 A1 Mar. 3, 2022

(30) Foreign Application Priority Data
Aug. 27, 2020 (JP) .............................. JP2020-143961

(51) Int. Cl.
| B60R 11/00 | (2006.01) |
| B60R 11/04 | (2006.01) |
| B60K 35/00 | (2006.01) |
| G06T 7/70 | (2017.01) |
| B60W 50/14 | (2020.01) |

(52) U.S. Cl.
CPC .............. B60R 11/04 (2013.01); B60K 35/00 (2013.01); G06T 7/70 (2017.01); B60K 2370/166 (2019.05); B60W 2050/146 (2013.01)

(58) Field of Classification Search
CPC ............ G06T 7/70; B60K 35/00; B60R 11/04
See application file for complete search history.

(56) References Cited

U.S. PATENT DOCUMENTS

| 10,618,453 B2* | 4/2020 | Furui ................... B60Q 1/0023 |
| 2012/0154785 A1* | 6/2012 | Gilliland .............. G05D 1/0214 |
| | | 356/5.01 |
| 2018/0361947 A1* | 12/2018 | Matori ................... B60R 11/04 |
| 2020/0174100 A1* | 6/2020 | Hori ........................ F21S 45/47 |
| 2020/0247307 A1* | 8/2020 | Tsutsumi ............... B60R 11/04 |
| 2022/0024316 A1* | 1/2022 | Suzuki ................... B60K 35/00 |

FOREIGN PATENT DOCUMENTS

WO WO 2019/021693 A1 1/2021

\* cited by examiner

*Primary Examiner* — Gerald J Sufleta, II
(74) *Attorney, Agent, or Firm* — Paratus Law Group, PLLC

(57) ABSTRACT

A moving body including an external world information acquisition device is autonomously movable based on external world information acquired by the external world information acquisition device. The external world information acquisition device is arranged on an inner side of the moving body than an outer shell member of the moving body, and is formed with an external world information acquisition surface. The outer shell member has an opening portion. The moving body includes a cover member which is provided between the external world information acquisition device and the opening portion. The external world information acquisition surface acquires the external world information via the cover member. The cover member has a flat plate shape, and is arranged to face the external world information acquisition surface, and to be inclined in an upper-lower direction and a left-right direction of the moving body with respect to the external world information acquisition surface.

9 Claims, 7 Drawing Sheets

SENSOR FOR AUTONOMOUSLY MOVABLE MOVING BODY

CROSS-REFERENCE TO RELATED APPLICATIONS

This application is based on and claims priority under 35 USC 119 from Japanese Patent Application No. 2020-143961 filed on Aug. 27, 2020.

TECHNICAL FIELD

The present disclosure relates to a moving body such as a vehicle, and more particularly to an autonomously movable moving body.

BACKGROUND ART

In the related art, a moving body on which an external world information acquisition device is mounted has been known. For example, WO-A-2019-021693 discloses a vehicle in which a light detection and ranging (LiDAR) device as an external world information acquisition device is mounted in a lamp chamber of a headlight provided on the left and right of a front portion of the vehicle, and the vehicle being capable of acquiring external world information in front of the vehicle. In addition, the vehicle described in WO-A-2019-021693 can perform a fully automatic driving operation (autonomous movement) from driving support based on the external world information acquired by the LiDAR device.

In the headlight of the vehicle disclosed in WO-A-2019-021693, the lamp chamber is partitioned by a housing and a translucent cover, and the LiDAR device acquires the external world information via the translucent cover. Further, in the vehicle disclosed in WO-A-2019-021693, a curved lens portion is formed in the translucent cover in order to expand a detectable area in which the external world information can be acquired by the LiDAR device.

In a moving body capable of autonomous movement, an external world information acquisition device such as a LiDAR device is required to accurately acquire external world information of a target area, which is an area of an external world to be preferentially acquired in the autonomous movement of a moving body.

However, in the vehicle disclosed in WO-A-2019-021693, the curved lens portion is formed in the translucent cover. In the lens portion, since a thickness of the translucent cover changes, light transmittance of the translucent cover changes in accordance with the thickness.

Light incident obliquely with respect to the translucent cover has an incident angle (an inclination angle with respect to a line perpendicular to the translucent cover) with respect to the translucent cover. Even w % ben the thickness of the translucent cover is uniform, the light transmittance changes in accordance with the incident angle of the light.

In general, as the thickness of the translucent cover increases and the incidence angle of the light increases, the light transmittance decreases. In the LiDAR device, accuracy of the external world information of the area acquired by a laser beam transmitted through an area where the light transmittance of the translucent cover is low may decrease.

However, depending on the convenience of a layout of the vehicle and the like, there is a case where the LiDAR device cannot be arranged to face the target area, which is the area of the external world to be preferentially acquired in the autonomous movement. At this time, in the vehicle described in WO-A-2019-021693, there is a possibility that the laser beam emitted toward the target area, which is the area of the external world to be preferentially acquired in the autonomous movement, passes through the area where the light transmittance of the translucent cover is low, and the accuracy of the external world information of the target area, which is the area of the external world to be preferentially acquired in the autonomous movement, decreases.

On the other hand, in the vehicle disclosed in WO-A-2019-021693, when a lens surface is arranged so as to focus on the target area, which is the area of the external world to be preferentially acquired while the vehicle autonomously moves and the translucent cover is attached to the vehicle, advanced processing accuracy is required for a curved surface and the lens surface, and the translucent cover having the curved surface or the lens surface is required to have high positional accuracy when attached to the vehicle, and therefore there is a problem that a manufacturing cost becomes high.

SUMMARY

An object of the present disclosure is to provide a moving body capable of accurately acquiring external world information of a target area, which is an area of an external world to be preferentially acquired in an autonomous movement, at a low cost.

According to the present disclosure, there is a moving body including:

an external world information acquisition device, in which:

the moving body is autonomously movable based on external world information acquired by the external world information acquisition device;

the external world information acquisition device is arranged on an inner side of the moving body than an outer shell member of the moving body;

the external world information acquisition device is formed with an external world information acquisition surface configured to acquire the external world information on a surface facing an outer side of the moving body, the external world information acquisition surface having a planner shape;

the outer shell member has an opening portion formed at a position where the opening portion overlaps at least a part of the external world information acquisition surface as viewed from the outer side of the moving body;

the moving body includes a cover member which is provided between the external world information acquisition device and the opening portion;

the external world information acquisition surface acquires the external world information via the cover member, and the cover member has a flat plate shape, and is arranged to face the external world information acquisition surface, and to be inclined in an upper-lower direction and a left-right direction of the moving body with respect to the external world information acquisition surface.

According to the present disclosure, by arranging the flat cover member to face the external world information acquisition surface and to be inclined in the upper-lower direction and the left-right direction of the moving body with respect to the external world information acquisition surface, it is possible to accurately acquire the external world information of a target area, which is an area of an external world to be preferentially acquired in an autonomous movement of the moving body, at a low cost.

DESCRIPTION OF EMBODIMENTS

Figure 1:
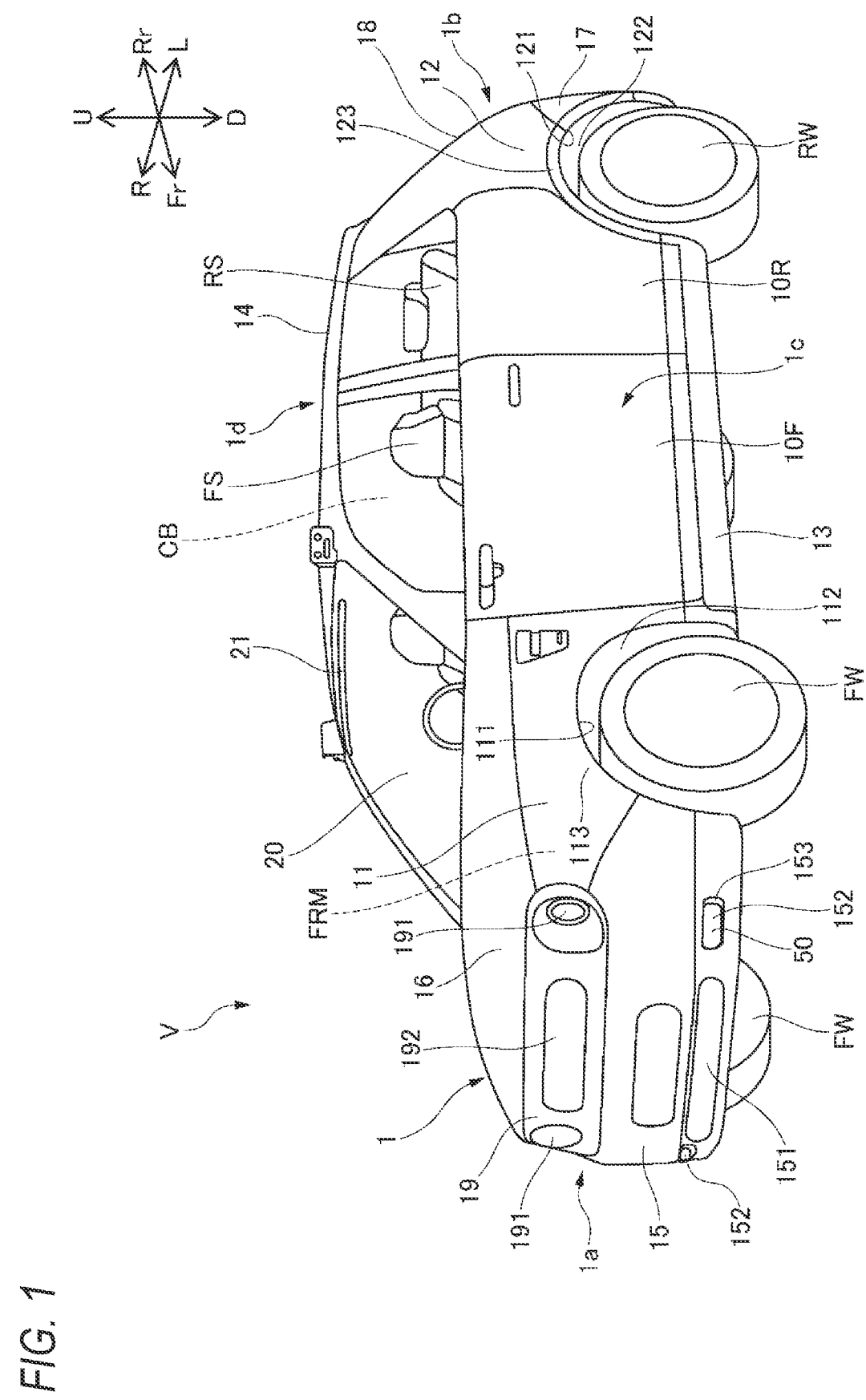
FIG. 1 is a perspective view of a vehicle according to an embodiment of the present disclosure, as viewed obliquely from the front left.

Hereinafter, a vehicle as an embodiment of a moving body of the present disclosure will be described with reference to the accompanying drawings. Noted that the drawings are viewed in directions of reference numerals. In the present specification and the like, in order to simplify and clarify the description, a front-rear direction, a left-right direction, and an upper-lower direction are described in accordance with directions viewed from a driver of a vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

(Vehicle)

First, a configuration of a vehicle V of the present embodiment will be described with reference to FIGS. 1 and 2.

The vehicle V is an autonomously movable moving body. Hereinafter, an autonomous movement of the vehicle V is also referred to as autonomous driving.

Figure 2:
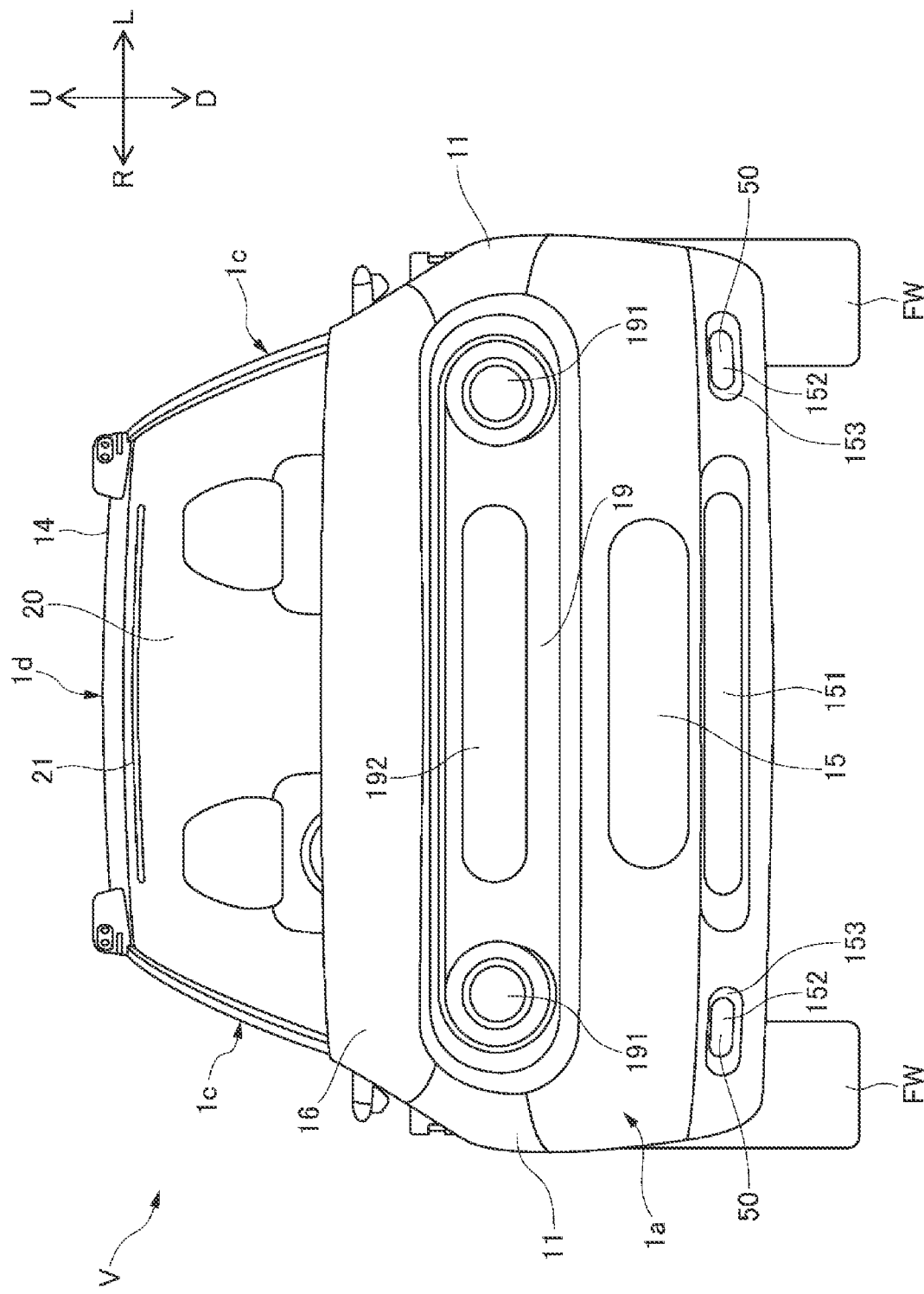
FIG. 2 is a front view of the vehicle of FIG. 1 as viewed from the front.

As illustrated in FIGS. 1 and 2, the vehicle V is an automobile including a drive source (not illustrated) and vehicle wheels having a drive wheel which is driven by power of the drive source and a turning wheel which can be turned. In the present embodiment, the vehicle V is a four-wheel automobile including a pair of left and right front wheels FW and a pair of left and right rear wheels RW. The drive source of the vehicle V is, for example, an electric motor. The drive source of the vehicle V may be an internal combustion engine such as a gasoline engine or a diesel engine, or a combination of the electric motor and the internal combustion engine. In addition, the drive source of the vehicle V may drive the pair of left and right front wheels FW, may drive the pair of left and right rear wheels RW, or may drive four wheels of the pair of left and right front wheels FW and the pair of left and right rear wheels RW. The front wheel FW and the rear wheel RW may both be the turning wheels which can turn, or either one of the front wheel FW and the rear wheel RW may be the turning wheel which can turn.

The vehicle V includes a skeleton member (not illustrated) having a monocoque structure by, for example, welding and assembling steel plate panels, and an outer shell member 1 covering the skeleton member and constituting an outer shell of the vehicle V. The vehicle V includes a vehicle compartment CB which accommodates an occupant, and a front room FRM which is formed in front of the vehicle compartment CB. Each of the vehicle compartment CB and the front room FRM is a space surrounded by the outer shell member 1. The vehicle compartment CB and the front room FRM are partitioned by a dash panel (not illustrated) extending in an upper-lower direction and a left-right direction. The drive source or the like of the vehicle V is accommodated in the front room FRM.

The outer shell member 1 includes a front surface 1a which faces the front of the vehicle V, a rear surface 1b which faces the rear of the vehicle V, a pair of left and right side surfaces 1c which face the left-right direction of the vehicle V, and an upper surface 1d which faces upward of the vehicle V.

The outer shell member 1 includes a pair of left and right front doors 10F forming the left and right side surfaces 1c of the vehicle V on the front side of the vehicle compartment CB, and a pair of left and right rear doors 10R forming the left and right side surfaces 1c of the vehicle V on the rear side of the vehicle compartment CB. Further, the outer shell member 1 includes a pair of left and right front fender panels 11 forming the left and right side surfaces 1c of the vehicle V in front of the front doors 10F, and a pair of left and right rear fender panels 12 forming the left and right side surfaces 1c of the vehicle V behind the rear doors 10R. The outer shell member 1 includes a pair of left and right side sills 13 extending in the front-rear direction from the front fender panels 11 to the rear fender panels 12 on the left side and the right side of the vehicle V along lower edges of the front door 10F and the rear door 10R. Further, the outer shell member 1 further includes a roof panel 14 which extends in the front-rear direction and the left-right direction along upper edges of the pair of left and right front doors 10F and the pair of left and right rear doors 10R and forms an upper surface of the vehicle compartment CB of the vehicle V. The outer shell member 1 further includes a front bumper 15 forming a front lower portion of the front room FRM of the vehicle V, and a bonnet 16 forming an upper surface of the front room FRM of the vehicle V. Further, the outer shell member 1 includes a rear bumper 17 forming a rear lower portion of the vehicle V, and a tailgate 18 forming a rear upper portion of the vehicle V.

Each of the front fender panels 11 is formed with a front wheel arch portion 111 which is curved in a substantially circular arc shape in which a lower edge of the front fender panel 11 is convex upward. A front wheel house 112 is formed below the front wheel arch portion 111, and the front wheel FW is accommodated in the front wheel house 112. Each of the front fender panels 11 is formed with a front blister fender portion 113 which bulges outward in the left-right direction of the vehicle V along the front wheel arch portion 111.

Each of the rear fender panel 12 is formed with a rear wheel arch portion 121 which is curved in a substantially circular arc shape in which a lower edge of the rear fender panel is convex upward. A rear wheel house 122 is formed below the rear wheel arch portion 121, and the rear wheel RW is accommodated in the rear wheel house 122. Each of the rear fender panels 12 is formed with a rear blister fender portion 123 which bulges outward in the left-right direction of the vehicle V along the rear wheel arch portion 121.

The front bumper 15 has a shape in which left and right ends of the front bumper 15 wrap around to the left and right front wheel arch portions 111.

A front garnish 19 which extends in the upper-lower direction and the left-right direction from the left front fender panel 11 to the right front fender panel 11 is provided above the front bumper 15 between the front bumper 15 and the bonnet 16. A pair of left and right headlights 191 which illuminate the front of the vehicle V are provided at both left and right end portions of the front garnish 19. The pair of left and right headlights 191 are provided so as to be separated from each other in the left-right direction. The front garnish 19 is provided with an information display unit 192 which extends in the left-right direction at a central portion of the vehicle V in the left-right direction between the pair of left and right headlights 191. The information display unit 192 displays various information in front of the vehicle V. A traffic participant (including a pedestrian, a bicycle, a motorcycle, other vehicles, or the like, and the same applies to the following description) existing in front of the vehicle V can visually recognize various information from the information display unit 192.

In this way, the front bumper 15 and the front garnish 19 form the front surface 1a of the outer shell member 1. The rear bumper 17 and the tailgate 18 form the rear surface 1b of the outer shell member 1. The pair of left and right front doors 10F, the pair of left and right rear doors 10R, the pair of left and right front fender panels 11, the pair of left and right rear fender panels 12, and the pair of left and right side sills 13 form the pair of left and right side surfaces 1c of the outer shell member 1. The roof panel 14 forms the upper surface 1d of the outer shell member 1. Further, in the left-right direction of the vehicle V, the outermost portion of the front blister fender portion 113 is the outermost portion of the side surface 1c of the outer shell member 1. The roof panel 14 is curved so as to be convex upward, and an uppermost portion of the roof panel 14 is an uppermost portion of the upper surface 1d of the outer shell member 1 in the upper-lower direction of the vehicle V, in a side view of the vehicle V.

A front window 20 is provided on the front surface of the vehicle cabin CB. The front window 20 is formed of a light transmitting member, for example, glass, which is visible to the outside of the vehicle from the inside of the vehicle compartment CB. The front window 20 extends downward from a front end portion of the roof panel 14 to a vicinity of a rear end portion of the bonnet 16 while being inclined forward. The front window 20 extends over substantially the entire area of the vehicle V in the left-right direction.

A front window display unit 21 extending in the left-right direction is provided at an upper end portion of the front window 20. The front window display unit 21 displays information based on a moving state (driving state) of the vehicle V to an outer portion of the vehicle V. In the present embodiment, the front window display unit 21 is a light emitting diode (LED) illumination device extending in the left-right direction at the upper end portion of the front window 20. The front window display unit 21 is turned on when the vehicle V is in an autonomous driving state in which the vehicle V autonomously moves, and is turned off when the vehicle V is not in the autonomous driving state. The traffic participant existing in front of the vehicle V can visually recognize information on whether the vehicle V is in the autonomous driving state from the front window display unit 21.

Front seats FS on which the occupant can sit and rear seats RS which are arranged behind the front seats FS and on which the occupant can sit are provided in the vehicle compartment CB which is inside the vehicle V.

A rear window (not illustrated) is provided on the tailgate 18 forming an upper portion of the rear surface 1b of the outer shell member 1 of the vehicle V. The rear window is formed of a light transmitting member, for example, a smoke glass, which is visible to the outside of the vehicle from the inside of the vehicle compartment CB. The rear window extends downward while being inclined rearward from an upper end portion of the tailgate 18 near a rear end portion of the roof panel 14. The rear window extends over substantially the entire region of the vehicle V in the left-right direction.

(Front Bumper)

As illustrated in FIG. 2, a lower portion of a front surface of the front bumper 15 is provided with a front grill 151 extending in the left-right direction at a center in the left-right direction of the vehicle V and opening portions 152 having a substantially oblong shape extending in the left-right direction at both outer sides of the front grill 151 in the left-right direction.

The front grill 151 introduces traveling wind from the front of the vehicle V into the front room FRM.

Figure 3:
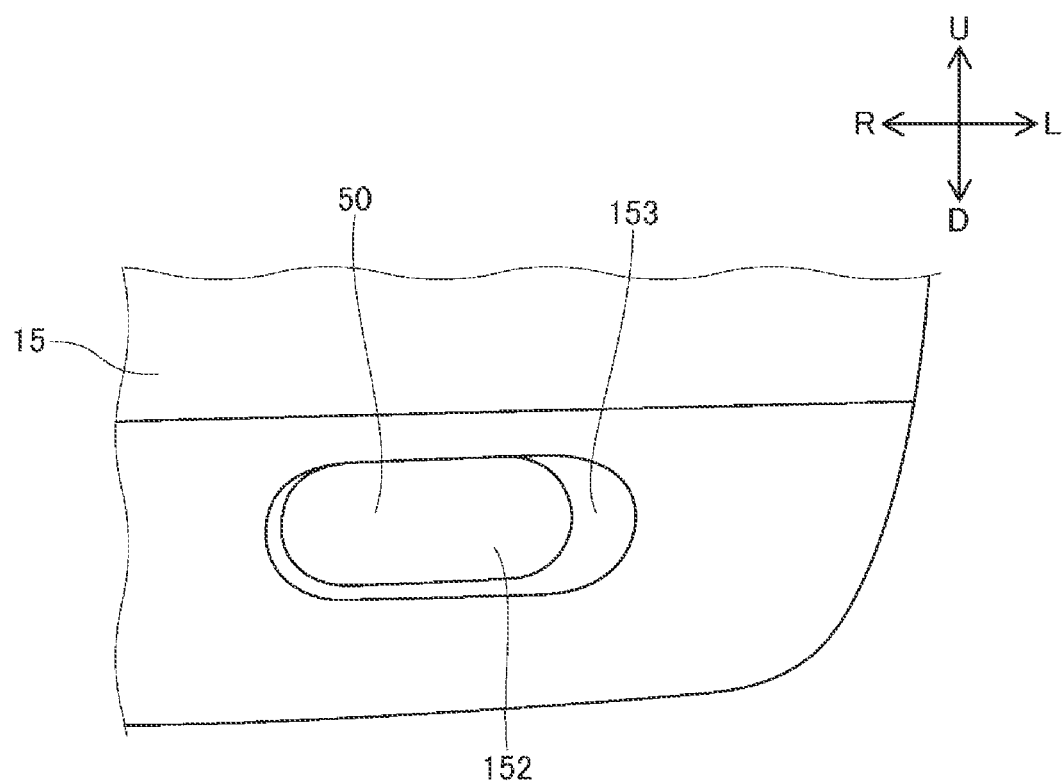
FIG. 3 is an enlarged view of a main part around an opening portion provided on a left outer side of a front grille of a front bumper of the vehicle in FIG. 1.

As illustrated in FIG. 3, the opening portion 152 provided on a left outer side of the front grille 151 is provided along the front bumper 15 on both outer sides of the front grille 151 in the left-right direction so as to be inclined toward a center side, that is, toward the rear of the vehicle V in the front-rear direction toward the outer side of the vehicle V in the left-right direction. That is, the opening portion 152 opens slightly obliquely forward on the outer side of the vehicle V in the left-right direction.

The front bumper 15 is further formed with an inner protruding portion 153 which extends in a tubular shape from an outer edge of the opening portion 152 toward the inner side of the vehicle V.

Although a detailed description of a configuration of the opening portion 152 provided on a right outer side of the front grill 151 is omitted, the opening portion 152 provided on the right outer side of the front grill 151 is configured to be left-right symmetrical to the opening portion 152 provided on the left outer side of the front grill 151 with respect to the center of the vehicle V in the left-right direction.

(LiDAR Device)

Figure 4:
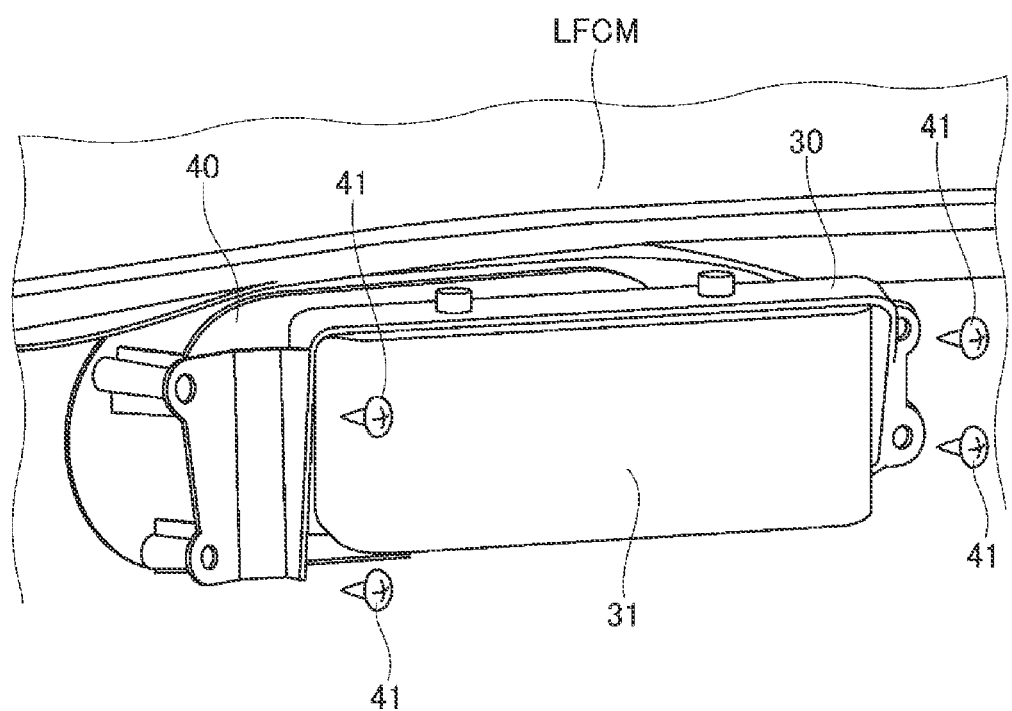
FIG. 4 is an enlarged view of a main part of a periphery of the opening portion in FIG. 3 as viewed with the front bumper removed.

As illustrated in FIG. 4, a light detection and ranging (LiDAR) device 30 is provided on an inner side of the vehicle V than the front bumper 15 constituting the front surface 1a of the outer shell member 1 in the front portion of the vehicle V. The LiDAR device 30 irradiates an object while scanning the object with a laser beam emitted in a pulsed manner, measures scattered light or reflected light thereof, and analyzes a distance to the object at a long distance and a property and a shape of the object. Therefore, the LiDAR device 30 acquires external world information 300 of the vehicle V. The LiDAR device 30 is an example of an external world information acquisition device which acquires the external world information 300.

In the present embodiment, a pair of left and right LiDAR devices 30 are provided on the inner side of the vehicle V with respect to the front bumper 15, and are arranged at the inner side of the vehicle V of the pair of left and right opening portions 152 provided in the front bumper 15.

Therefore, the pair of left and right LiDAR devices 30 are arranged at the front portion of the vehicle V, and are arranged so as to be offset to the left side and the right side from the center of the vehicle V in the left-right direction, respectively.

The LiDAR device 30 arranged so as to be offset to the left side from the center of the vehicle V in the left-right direction acquires left-side external world information 300L as external world information 300, the left-side external world information 300L being on the front side and a diagonally front left side of the vehicle V. The LiDAR device 30 arranged so as to be offset to the right side from the center of the vehicle V in the left-right direction acquires right-side external world information 300R as the external world information 300, the right-side external world information 300R being on the front side and a diagonally front right side of the vehicle V.

In the present specification, a configuration of the LiDAR device 30 which is arranged so as to be offset to the left side from the center of the vehicle V in the left-right direction, among the pair of left and right LiDAR devices 30, will be described in detail. Although a detailed description of the configuration of the LiDAR device 30 which is arranged so as to be offset to the right side from the center of the vehicle V in the left-right direction is omitted, the LiDAR device 30 which is arranged so as to be offset to the right side from the center of the vehicle V in the left-right direction is configured to be left-right symmetrical to the LiDAR device 30 which is arranged so as to be offset to the left side from the center of the vehicle V in the left-right direction, with respect to the center of the vehicle V in the left-right direction.

The LiDAR device 30 has a substantially rectangular parallelepiped shape. The LiDAR device 30 is fixed to a bracket 40 fixed to the vehicle V with fastening members 41 such as screws. In the present embodiment, the bracket 40 is fixed to a lower front cross member LFCM which is a front skeleton member of the vehicle V. The lower front cross member LFCM extends in the left-right direction on the inner side of the vehicle V of the front bumper 15.

The LiDAR device 30 includes an external world information acquisition surface 31 which emits a laser beam emitted in a pulsed manner while scanning and measures scattered light and reflected light thereof. The LiDAR device 30 scans and emits the laser beam emitted in a pulsed manner from the external world information acquisition surface 31 while changing an angle in the upper-lower direction and the left-right direction. The external world information acquisition surface 31 has a planar shape, constitutes one side surface of the substantially rectangular parallelepiped LiDAR device 30, and is a surface facing the outer side of the vehicle V. The external world information acquisition surface 31 extends substantially vertically in the upper-lower direction, and extends in the left-right direction so as to be inclined toward the center side, that is, toward the rear of the vehicle V in the front-rear direction toward the outer side of the vehicle V in the left-right direction.

Returning to FIG. 3, the opening portion 152 of the front bumper 15 is formed at a position at which the opening portion 152 overlaps at least a part of the external world information acquisition surface 31 of the LiDAR device 30 as viewed from the outer side of the vehicle V.

(Cover Member)

Figure 5:
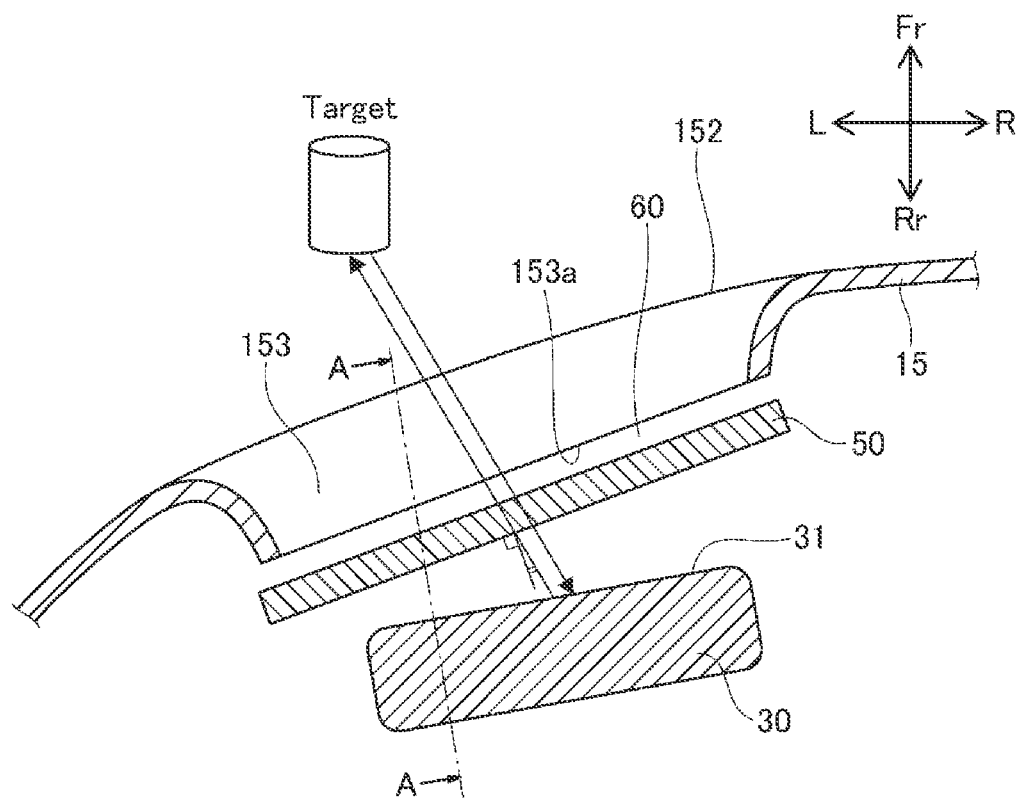
FIG. 5 is a sectional view of a main part of the vehicle according to the embodiment of the present disclosure, in which a positional relationship between a LiDAR device and a cover member is viewed from above.
Figure 6:
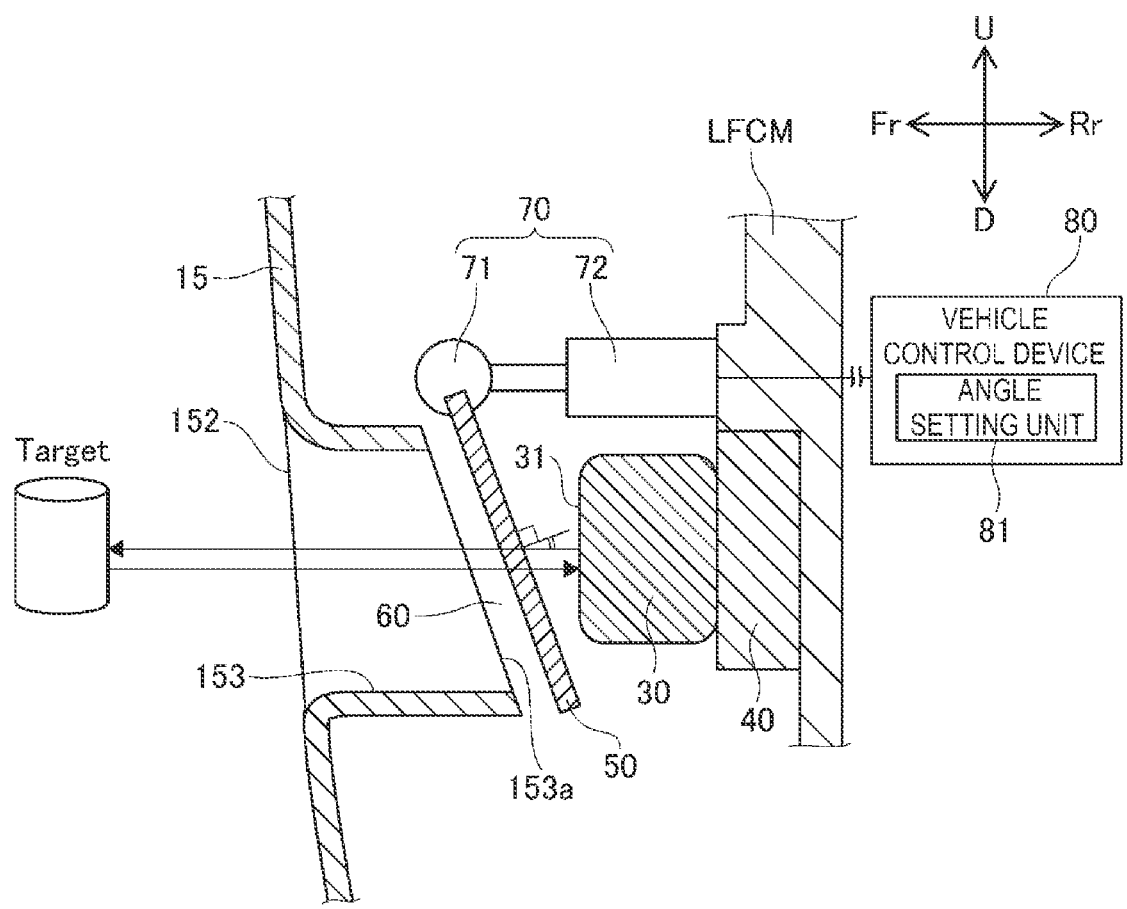
FIG. 6 is a view illustrating a sectional view taken along a line A-A of FIG. 5 and a schematic view of an angle changing device.

As illustrated in FIGS. 3, 5 and 6, the vehicle V further includes a cover member 50 provided between the LiDAR device 30 and the opening portion 152 of the front bumper 15. The cover member 50 is formed of a light transmitting member, for example, a smoke glass, through which the laser beam emitted from the external world information acquisition surface 31 of the LiDAR device 30 can be transmitted. The cover member 50 has a flat plate shape. The cover member 50 faces the external world information acquisition surface 31 of the LiDAR device 30, and covers the inner protruding portion 153 on the inner side of the vehicle V then the inner protruding portion 153 of the front bumper 15.

Therefore, the laser beam emitted from the external world information acquisition surface 31 of the LiDAR device 30 passes through the cover member 50 and is emitted to the outer portion of the vehicle V from the opening portion 152 of the front bumper 15, and the scattered light or the reflected light of the laser beam with which the object is irradiated is incident on the external world information acquisition surface 31 of the LiDAR device 30 from the opening portion 152 of the front bumper 15 through the cover member 50. In this way, the external world information acquisition surface 31 of the LiDAR device 30 acquires the external world information 300 of the vehicle V via the cover member 50.

As illustrated in FIG. 5, the cover member 50 is arranged so as to be inclined in the left-right direction with respect to the external world information acquisition surface 31 of the LiDAR device 30. In the present embodiment, the cover member 50 is arranged so as to be inclined toward the center side, that is, toward the rear of the vehicle V in the front-rear direction toward the outer side of the vehicle V in the left-right direction with respect to the external world information acquisition surface 31 of the LiDAR device 30.

Accordingly, the front bumper 15 can have a shape which is curved toward the center side, that is, toward the rear of the vehicle V in the front-rear direction toward the outer side of the vehicle V in the left-right direction, without forming a useless space between the front bumper 15 and the cover member 50. Therefore, the front bumper 15 can have a shape with less air resistance when the vehicle V travels without forming the useless space between the front bumper 15 and the cover member 50.

As illustrated in FIG. 6, the cover member 50 is arranged so as to be inclined in the upper-lower direction with respect to the external world information acquisition surface 31 of the LiDAR device 30. In the present embodiment, the cover member 50 is arranged so as to be inclined toward the center side, that is, toward the rear of the vehicle V in the front-rear direction toward a lower side of the vehicle V in the upper-lower direction with respect to the external world information acquisition surface 31 of the LiDAR device 30.

Accordingly, the front bumper 15 can have a shape which is curved toward the center side, that is, toward the rear of the vehicle V in the front-rear direction toward the lower side of the vehicle V in the upper-lower direction, without forming a useless space between the front bumper 15 and the cover member 50. Therefore, the front bumper 15 can have a shape with less air resistance when the vehicle V travels without forming the useless space between the front bumper 15 and the cover member 50.

In this way, the cover member 50 is arranged so as to face the external world information acquisition surface 31 of the LiDAR device 30, and to be inclined in the upper-lower direction and the left-right direction with respect to the external world information acquisition surface 31 of the LiDAR device 30.

The LiDAR device 30 scans and emits the laser beam emitted in a pulsed manner from the external world information acquisition surface 31 while changing the angle in the upper-lower direction and the left-right direction. Therefore, for example, even in a case where the cover member 50 is arranged so as to be a plane parallel to the external world information acquisition surface 31 of the LiDAR device 30, the laser beam emitted at an angle not perpendicular to the external world information acquisition surface 31 is inclined and incident on the cover member 50, so that an incident angle (an inclination angle with respect to a line perpendicular to the cover member 50) is generated in the upper-lower direction and the left-right direction with respect to the cover member 50.

The cover member 50 formed of the light transmitting member through which the laser beam can be transmitted has different light transmittance of the laser beam depending on the incident angle of the laser beam. In general, as the incident angle of the laser beam increases, the light transmittance of the laser beam decreases in the cover member 50. When the laser beam emitted from the external world information acquisition surface 31 is inclined and incident on the cover member 50, an incident angle with respect to the cover member 50 is generated in the laser beam, and the light transmittance of the laser beam transmitted through the cover member 50 decreases, the accuracy of the external world information 300 acquired by the laser beam may decrease.

On the other hand, the LiDAR device 30 is required to accurately acquire the external world information of a target area as the external world information 300, the external world information of a target area being an area of an external world to be preferentially acquired in the autonomous driving of the vehicle V.

However, the vehicle V is not necessarily capable of arranging the LiDAR device 30 so that the external world information acquisition surface 31 faces the above-described target area due to the convenience of a layout or the like. At this time, when the cover member 50 is arranged so as to be a plane parallel to the external world information acquisition surface 31 of the LiDAR device 30, the laser beam emitted from the external world information acquisition surface 31 toward the target area described above may be inclined and incident on the cover member 50, an incident angle with respect to the cover member 50 may be generated in the laser beam, the light transmittance of the laser beam transmitted through the cover member 50 may decrease, and the accuracy of the external world information 300 of the target area described above acquired by the laser beam may decrease.

In the present embodiment, the cover member 50 can be arranged so as to be inclined in the upper-lower direction and the left-right direction with respect to the external world information acquisition surface 31 of the LiDAR device 30 so that the light transmittance in the cover member 50 of the laser beam emitted from the external world information acquisition surface 31 toward the target area, which is the area of the external world to be preferentially acquired in the autonomous driving of the vehicle V, becomes equal to or greater than a predetermined value. Accordingly, due to the convenience of the layout of the vehicle V or the like, in attachment of the LiDAR device 30 to the vehicle V, there are restrictions in an arrangement position of the LiDAR device 30 and a direction in which the external world information acquisition surface 31 faces, and for example, even in a case where the LiDAR device 30 cannot be arranged so that the external world information acquisition surface 31 faces the target area described above, the LiDAR device 30 can accurately acquire the external world information of the target area described above.

In a case where the cover member 50 is used as a curved surface or a lens surface, and the laser beam emitted from the external world information acquisition surface 31 of the LiDAR device 30 is accurately emitted toward the target area described above, advanced processing accuracy is required for the curved surface and the lens surface, and the cover member having the curved surface or the lens surface is required to have high positional accuracy when the cover member is attached to the vehicle V, and therefore, a manufacturing cost becomes high.

In the present embodiment, the cover member 50 has the flat plate shape, and the LiDAR device 30 can accurately acquire the external world information of the target area described above at a low cost without using the curved surface or the lens surface.

Therefore, in the present embodiment, it is possible to accurately acquire the external world information of the target area, which is the area of the external world to be preferentially acquired in the autonomous driving of the vehicle V, at a low cost.

Since the LiDAR devices 30 are arranged at the front portion of the vehicle V and are arranged so as to be offset to the left side and the right side from the center of the vehicle V in the left-right direction, respectively, the LiDAR device 30 can easily acquire the external world information of diagonally front left and right areas of the vehicle V in a wider range.

As illustrated in FIGS. 5 and 6, a gap portion 60 is formed between the cover member 50 and a protruding end portion 153a of the inner protruding portion 153 of the front bumper 15.

Therefore, even when a flying object (including a small stone, an insect, mud, and the like) from the outer portion of the vehicle V enters the inner protruding portion 153 from the opening portion 152 of the front bumper 15, the flying object is discharged to the outer portion of the inner protruding portion 153 from the gap portion 60 without being deposited on the inner protruding portion 153. As a result, it is possible to prevent the flying object from the outer portion of the vehicle V from being deposited on the inner protruding portion 153 of the front bumper 15 and becoming an obstacle when the LiDAR device 30 acquires the external world information.

In the present embodiment, the gap portion 60 is formed between the front bumper 15 and the cover member 50 over the entire circumference of the protruding end portion 153a of the inner protruding portion 153 of the front bumper 15, but may be formed between a portion of the protruding end portion 153a of the inner protruding portion 153 of the front bumper 15 and the cover member 50. At this time, the gap portion 60 is preferably formed between the protruding end portion 153a of a lower surface portion of the inner protruding portion 153 of the front bumper 15 and the cover member 50. Since the flying object from the outer portion of the vehicle V is easily deposited on the lower surface portion of the inner protruding portion 153 of the front bumper 15 due to gravity, the gap portion 60 is formed between the protruding end portion 153a of the lower surface portion of the inner protruding portion 153 of the front bumper 15 and the cover member 50, so that it is possible to more effectively prevent the flying object from being deposited on the inner protruding portion 153.

(Angle Changing Device)

As illustrated in FIG. 6, the cover member 50 is fixed to the vehicle V so as to be able to change the angle thereof in the upper-lower direction and the left-right direction of the vehicle V. Further, the vehicle V includes an angle changing device 70 which changes the angle of the vehicle V in the upper-lower direction and the left-right direction.

The angle changing device 70 includes a movable support portion 71 which supports the cover member 50 and moves such that the angle of the cover member 50 in the upper-lower direction and/or the left-right direction is changeable, and a drive portion 72 which drives the movable support portion 71. The angle changing device 70 is connected to a vehicle control device 80 via a communication medium so as to be able to perform data communication with each other. The vehicle control device 80 includes an angle setting unit 81 which sets an angle of the cover member 50 in the upper-lower direction and/or the left-right direction. The vehicle control device 80 will be described in detail later.

The movable support portion 71 supports the cover member 50, and is connected to the drive portion 72 so as to be able to change the angle of the cover member 50 in the upper-lower direction and/or the left-right direction. The movable support portion 71 is driven by the drive portion 72, and the angle of the cover member 50 in the upper-lower direction and/or the left-right direction is changed by driving the movable support portion 71.

The drive portion 72 is, for example, a drive unit such as a motor unit which drives the movable support portion 71, and is fixed to the lower front cross member LFCM which is the front skeleton member of the vehicle V. Since the drive portion 72 is fixed to the lower front cross member LFCM, the angle changing device 70 is fixed to the vehicle V.

(Vehicle Control Device)

Figure 7:
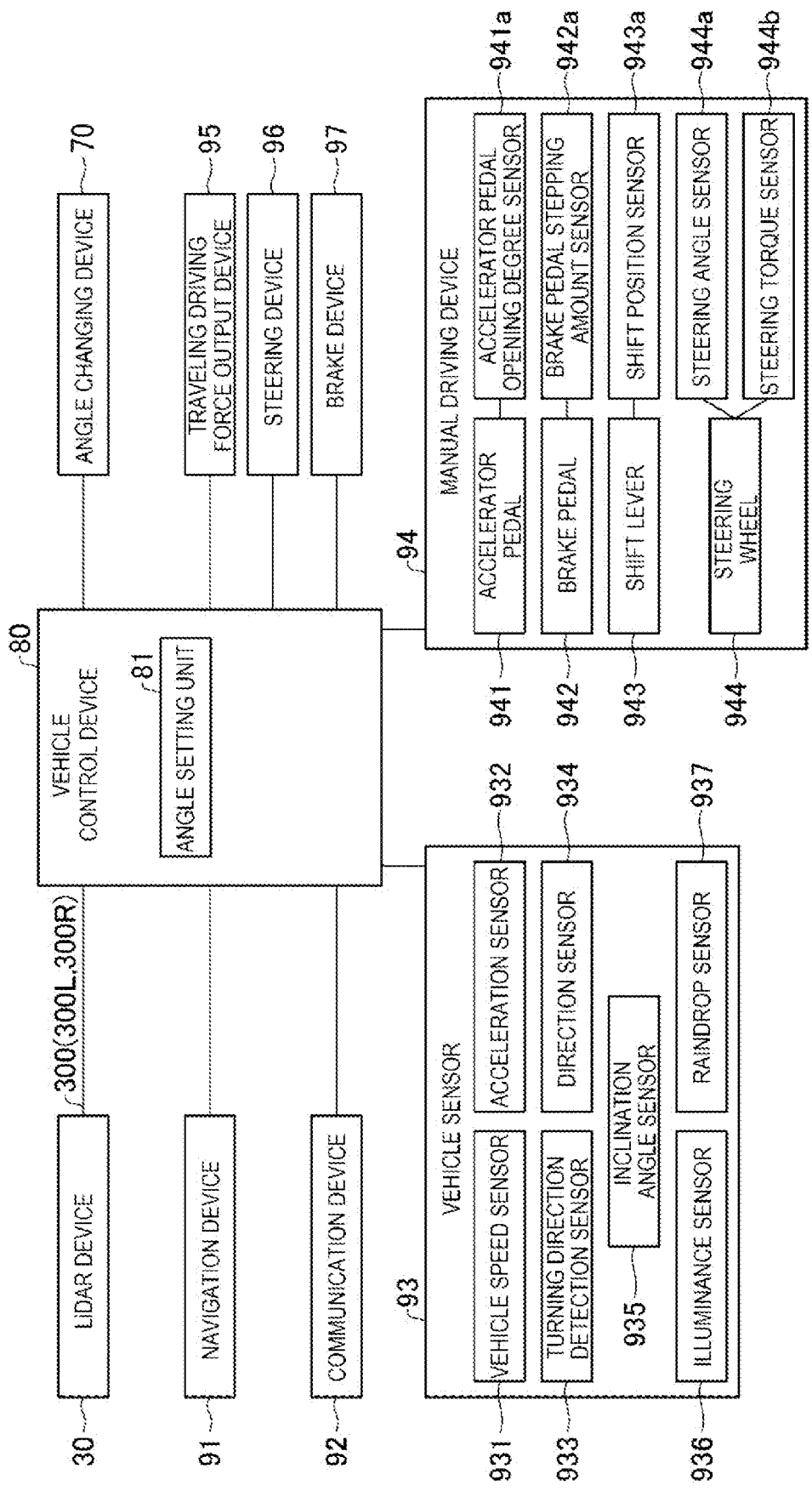
FIG. 7 is a block diagram illustrating a vehicle control device of the vehicle in FIG. 1.

Next, the vehicle control device 80 mounted on the vehicle V will be described with reference to FIG. 7.

The vehicle V is equipped with a navigation device 91, a communication device 92, a vehicle sensor 93, a manual driving device 94, a traveling driving force output device 95, a steering device 96, and a brake device 97 in addition to the above-described LiDAR device 30, the cover member 50, and the angle changing device 70.

The vehicle control device 80 is connected to the LiDAR device 30, the angle changing device 70, the navigation device 91, the communication device 92, the vehicle sensor 93, the manual driving device 94, the traveling driving force output device 95, the steering device 96, and the brake device 97 so as to be able to perform data communicate with each other via a communication medium.

The navigation device 91 includes a global navigation satellite system (GNSS) receiver, map information, and the like. The navigation device 91 has a function of detecting a current position of the vehicle V by the GNSS receiver and deriving a route to a destination designated by an occupant or the like of the vehicle V based on the detected current position and map information.

The communication device 92 performs wireless communication with an information providing server of a system which monitors a traffic situation of a road, and acquires traffic information indicating a traffic situation of a road on which the vehicle V is traveling or a road on which the vehicle V is scheduled to travel. The traffic information includes information such as congestion information in front, required time information for passing through a congestion point, accident/failure vehicle/construction information, speed regulation and lane regulation information, position information of a parking lot, and full/empty information of a parking lot/service area/parking area. The communication device 92 may acquire the traffic information by road-to-vehicle communication with a wireless beacon provided on a side band of a road or the like, or by vehicle-to-vehicle communication with another vehicle traveling around the vehicle V.

The communication device 92 performs wireless communication with an information providing server of a Traffic Signal Prediction System (TSPS), and acquires signal information of a traffic light provided on a road on which the vehicle V is traveling or a road on which the vehicle V is scheduled to travel. The TSPS supports driving for smoothly passing through a signal intersection using the signal information of the traffic light. The communication device 92 may acquire the signal information by the road-to-vehicle communication with the wireless beacon provided on the side band of the road or the like, or by vehicle-to-vehicle communication with another vehicle traveling around the vehicle V.

The vehicle sensor 93 has a function of detecting various information on the vehicle V. The vehicle sensor 93 includes various sensors which detect the moving state of the vehicle V, which include a vehicle speed sensor 931 which detects a vehicle speed of the vehicle V, an acceleration sensor 932 which detects an acceleration in the front-rear direction and the left-right direction of the vehicle V, a turning direction detection sensor 933 which detects a turning direction of the vehicle V from an angular velocity around a vertical axis of the vehicle V, a direction sensor 934 which detects a direction of the vehicle V, and an inclination angle sensor 935 which detects an inclination angle of the vehicle V. The vehicle sensor 93 further includes various sensors which detect an external environment of the vehicle V, which include an illuminance sensor 936 which detects illuminance of a place where the vehicle V is existing, and a raindrop sensor 937 which detects an amount of raindrops in the place where the vehicle V is existing.

The manual driving device 94 includes an accelerator pedal 941 which is an acceleration/deceleration operation member which receives an acceleration/deceleration instruction from the occupant, a brake pedal 942 which is a braking operation member which receives a braking instruction by the occupant, a shift lever 943 which is a shift operation member for receiving an instruction to change a shift stage by the occupant, and a steering wheel 944 which is a steering member which receives a turning instruction by the occupant.

The manual driving device 94 further includes an accelerator pedal opening degree sensor 941a which detects a stepping-down amount of the accelerator pedal 941 and outputs an accelerator opening degree signal to the vehicle control device 80, a brake pedal stepping amount sensor 942a which detects the stepping-down amount (or a stepping-down force) of the brake pedal 942 and outputs a brake signal to the vehicle control device 80, a shift position sensor 943a which detects the shift stage instructed by the shift lever 943 and outputs a shift position signal to the vehicle control device 80, a steering angle sensor 944a which detects a steering angle of the steering wheel 944 and outputs a steering angle signal to the vehicle control device 80, and a steering torque sensor 944b which detects a torque applied to the steering wheel 944 and outputs a steering torque signal to the vehicle control device 80.

The traveling driving force output device 95 is a device which includes a drive source and outputs power of the drive source as a driving force of the vehicle V to the front wheel FW and/or the rear wheel RW, which are the drive wheels.

The steering device 96 is a device which changes a direction of the front wheel FW and/or the rear wheel RW, which are turning wheels of the vehicle V.

The brake device 97 is a device which outputs a braking force to the front wheel FW and the rear wheel RW.

The vehicle control device 80 is configured by, for example, one or more processors or hardware having equivalent functions. The vehicle control device 80 may have a configuration in which a processor such as a central processing unit (CPU), a storage device, an electronic control unit (ECU) in which a communication interface is connected by an internal bus, a micro-processing unit (MPU), or the like are combined.

The vehicle control device 80 controls the driving (movement) of the vehicle V by controlling the traveling driving force output device 95, the steering device 96, and the brake device 97. The vehicle control device 80 controls the traveling driving force output device 95, the steering device 96, and the brake device 97 by the processor executing a program (software). In addition, some or all of these control functions may be realized by hardware such as large scale integration (LSI) or an application specific integrated circuit (ASIC), or may be realized by a combination of software and hardware.

Based on an operation of the manual driving device 94 by the occupant, the vehicle control device 80 can control the traveling driving force output device 95, the steering device 96, and the brake device 97 to cause the vehicle V to be manually operated.

When the vehicle V is manually operated, the vehicle control device 80 may control the traveling driving force output device 95, the steering device 96, and the brake device 97 based on one or more information of the external world information 300 (the left-side external world information 300L and the right-side external world information 300R) acquired by the LiDAR device 30, the current position of the vehicle V detected by the navigation device 91, the map information of the navigation device 91, the route to the destination of the vehicle V derived by the navigation device 91, the traffic information and the signal information acquired by the communication device 92, and the moving state of the vehicle V and the external environment of the vehicle V acquired by the vehicle sensor 93, in addition to the accelerator opening degree signal, the brake signal, the shift position signal, the steering angle signal, the steering torque signal, and the like output from the manual driving device 94.

Without depending on the operation of the manual driving device 94 by the occupant, the vehicle control device 80 can control the traveling driving force output device 95, the steering device 96, and the brake device 97 to cause the vehicle V to autonomously operate (autonomously move).

When the vehicle V is autonomously operated, the vehicle control device 80 controls the traveling driving force output device 95, the steering device 96, and the brake device 97 based on the external world information 300 (the left-side external world information 300L and the right-side external world information 300R) acquired by the LiDAR device 30, the current position of the vehicle V detected by the navigation device 91, the map information of the navigation device 91, the route to the destination of the vehicle V derived by the navigation device 91, the traffic information and the signal information acquired by the communication device 92, and the moving state of the vehicle V and the external environment of the vehicle V acquired by the vehicle sensor 93 to cause the vehicle V to autonomously operate (autonomously move).

As described above, the vehicle control device 80 includes the angle setting unit 81 which sets the angle of the cover member 50 in the upper-lower direction and/or the left-right direction.

The angle setting unit 81 calculates a set angle of the cover member 50 in the upper-lower direction and/or the left-right direction based on the moving state of the vehicle V detected by various sensors of the vehicle sensor 93 which detects the moving state of the vehicle V including the vehicle speed sensor 931, the acceleration sensor 932, the turning direction detection sensor 933, the direction sensor 934, and the inclination angle sensor 935.

The vehicle control device 80 outputs a set angle signal calculated by the angle setting unit 81 to the drive portion 72 of the angle changing device 70. The drive portion 72 drives the movable support portion 71 based on the set angle signal output from the vehicle control device 80, and changes the angle of the cover member 50 in the upper-lower direction and/or the left-right direction so as to be the set angle.

In this way, the angle changing device 70 changes the angle of the cover member 50 in the upper-lower direction and/or the left-right direction based on the moving state of the vehicle V detected by the various sensors of the vehicle sensor 93.

Accordingly, since the cover member 50 can change the angle in the upper-lower direction and/or the left-right direction based on the moving state of the vehicle V, even when the target area, which is the area of the external world to be preferentially acquired in the autonomous driving of the vehicle V, changes in accordance with the moving state of the vehicle V when the external world information 300 is acquired by the LiDAR device 30, the LiDAR device 30 can accurately acquire the external world information of the target area.

The angle setting unit 81 calculates the set angle of the cover member 50 in the upper-lower direction and/or the left-right direction based on the turning direction of the vehicle V detected by the turning direction detection sensor 933 among the vehicle sensors 93 which detect the moving state of the vehicle V.

Therefore, the angle changing device 70 changes the angle of the cover member 50 in the upper-lower direction and/or the left-right direction based on the turning direction of the vehicle V detected by the turning direction detection sensor 933.

Accordingly, since the cover member 50 can change the angle in the upper-lower direction and/or the left-right direction based on the turning direction of the vehicle V, even when the target area, which is the area of the external world to be preferentially acquired in the autonomous driving of the vehicle V, changes in accordance with the turning direction of the vehicle V when the external world information 300 is acquired by the LiDAR device 30, the LiDAR device 30 can accurately acquire the external world information of the target area.

The angle setting unit 81 calculates the set angle of the cover member 50 in the upper-lower direction and/or the left-right direction based on the acceleration of the vehicle V in the front-rear direction and/or the left-right direction detected by the acceleration sensor 932 among the vehicle sensors 93 which detect the moving state of the vehicle V.

Therefore, the angle changing device 70 changes the angle of the cover member 50 in the upper-lower direction and/or the left-right direction based on the acceleration of the vehicle V in the front-rear direction and/or the left-right direction detected by the acceleration sensor 932.

Accordingly, since the cover member 50 can change the angle in the upper-lower direction and/or the left-right direction based on the acceleration of the vehicle V in the front-rear direction and/or the left-right direction, even when the target area, which is the area of the external world to be preferentially acquired in the autonomous driving of the vehicle V, changes in accordance with the acceleration of the vehicle V in the front-rear direction and/or the left-right direction when the external world information 300 is acquired by the LiDAR device 30, the LiDAR device 30 can accurately acquire the external world information of the target area.

In the present embodiment, the angle setting unit 81 calculates the set angle of the cover member 50 in the upper-lower direction and/or the left-right direction based on the acceleration in the front-rear direction of the vehicle V detected by the acceleration sensor 932 among the vehicle sensors 93 which detect the moving state of the vehicle V.

Therefore, the angle changing device 70 changes the angle of the cover member 50 in the upper-lower direction and/or the left-right direction based on the acceleration of the vehicle V in the front-rear direction detected by the acceleration sensor 932.

Accordingly, since the cover member 50 can change the angle in the upper-lower direction and/or the left-right direction based on the acceleration of the vehicle V in the front-rear direction, even when the target area, which is the area of the external world to be preferentially acquired in the autonomous driving of the vehicle V, changes in accordance with the acceleration in the front-rear direction of the vehicle V when the external world information 300 is acquired by the LiDAR device 30, the LiDAR device 30 can accurately acquire the external world information of the target area. For example, in a case where the vehicle V is moving in a forward direction at a high acceleration, a farther side becomes the target area, and the angle changing device 70 can change the angle of the cover member 50 in the upper-lower direction and/or the left-right direction, so that the external world information of the target area farther away can be accurately acquired. In addition, for example, in a case where the vehicle V is moving at a rearward direction acceleration (deceleration state or the like), a near side and a lateral side become the target area, and the angle changing device 70 can change the angle of the cover member 50 in the upper-lower direction and/or the left-right direction, so that the external world information of the target area on the near side and the lateral side can be accurately acquired.

Although one embodiment of the present disclosure has been described above with reference to the accompanying drawings, it is needless to say that the present disclosure is not limited to such an embodiment. It is apparent to those skilled in the art that various changes and modifications can be conceived within the scope of the claims, and it is also understood that the various changes and modifications belong to the technical scope of the present disclosure. In addition, the constituent elements in the above-described embodiment may be freely combined without departing from a spirit of the disclosure.

For example, in the present embodiment, the vehicle has been described as an example of the moving body of the present disclosure, but the moving body is not limited to the vehicle. The moving body is not limited to a vehicle, and may be a robot, a ship, an aircraft, or the like which includes a drive source and is movable by power of the drive source.

For example, in the present embodiment, it is assumed that the external world information acquisition device is the LiDAR device 30, but the LiDAR device 30 is the example of the external world information acquisition device. The external world information acquisition device is not limited to the LiDAR device 30, may be a device capable of acquiring the external world information of the vehicle V by means other than the LiDAR, and may be, for example, a millimeter wave radar device, a camera device, or the like.

For example, in the present embodiment, the pair of left and right LiDAR devices 30 are provided on the inner side of the vehicle V with respect to the front bumper 15 constituting the front surface 1a of the outer shell member 1 in the front portion of the vehicle V. However, the pair of left and right LiDAR devices 30 may be provided on the inner side of the vehicle V with respect to the rear bumper 17 constituting the rear surface 1b of the outer shell member 1 in the rear portion of the vehicle V. In addition, the pair of left and right LiDAR devices 30 may be provided on the inner side of the vehicle V with respect to the front fender panel 11 and the rear fender panel 12 constituting the side surface 1c of the outer shell member 1 in side portions of the vehicle V.

In the present specification, at least the following matters are described. In the parentheses, the corresponding constituent elements and the like in the above-described embodiment are illustrated as an example, but the present disclosure is not limited thereto.

(1) A moving body (vehicle V) including:
an external world information acquisition device (LiDAR device 30), in which:
the moving body is autonomously movable based on external world information (external world information 300) acquired by the external world information acquisition device;
the external world information acquisition device is arranged on an inner side of the moving body than an outer shell member (outer shell member 1) of the moving body;
the external world information acquisition device is formed with an external world information acquisition surface (external world information acquisition surface 31) configured to acquire the external world information on a surface facing an outer side of the moving body, the external world information acquisition surface having a planner shape;
the outer shell member has an opening portion (opening portion 152) formed at a position where the opening portion overlaps at least a part of the external world information acquisition surface as viewed from the outer side of the moving body;
the moving body includes a cover member which is provided between the external world information acquisition device and the opening portion;
the external world information acquisition surface acquires the external world information via the cover member; and
the cover member has a flat plate shape, and is arranged to face the external world information acquisition surface, and to be inclined in an upper-lower direction and a left-right direction of the moving body with respect to the external world information acquisition surface.

According to (1), since the cover member is arranged to face the external world information acquisition surface and to be inclined in the upper-lower direction and the left-right direction of the moving body with respect to the external world information acquisition surface, even in a case where there are restrictions in an arrangement position of the external world information acquisition device or a direction in which the external world information acquisition surface of the external world information acquisition device faces in attachment of the external world information acquisition device to the moving body due to the convenience of a layout of the moving body or the like, the external world information acquisition device can accurately acquire the external world information of a target area, which is an area of the an external world to be preferentially acquired in an autonomous movement of the moving body.

Since the cover member has the flat plate shape, the external world information acquisition device can accurately acquire the external world information of the target area, which is the area of the external world to be preferentially acquired in the autonomous movement of the moving body, at a low cost, without using a curved surface or a lens surface.

As a result, it is possible to accurately acquire the external world information of the target area, which is the area of the external world to be preferentially acquired in the autonomous movement of the moving body, at a low cost.

(2) The moving body according to (1), in which:

the external world information acquisition device is arranged at a front portion or a rear portion of the moving body, and is arranged to be offset in the left-right direction from a center of the moving body in the left-right direction.

According to (2), since the external world information acquisition device is arranged at the front portion or the rear portion of the moving body and is arranged to be offset in the left-right direction from the center of the moving body in the left-right direction, the external world information acquisition device can easily acquire the external world information of diagonally front left and right areas of the moving body in a wider range.

(3) The moving body according to (1) or (2), in which:

the external world information acquisition device is arranged at a front portion or a rear portion of the moving body; and the cover member is arranged to be inclined toward a center side of the moving body in the front-rear direction of the moving body toward the outer side of the moving body in the left-right direction with respect to the external world information acquisition surface.

According to (3), since the external world information acquisition device is arranged at the front portion or the rear portion of the moving body, and the cover member is arranged to be inclined toward the center side of the moving body in the front-rear direction of the moving body toward the outer side of the moving body in the left-right direction with respect to the external world information acquisition surface, the outer shell member can have a shape which is curved toward the center side of the moving body in the front-rear direction toward the outer side of the moving body in the left-right direction without forming a useless space between the outer shell member and the cover member. Therefore, the outer shell member can have a shape with less air resistance when the moving body travels without forming the useless space between the outer shell member and the cover member.

(4) The moving body according to any one of (1) to (3), in which:

the external world information acquisition device is arranged at a front portion or a rear portion of the moving body; and the cover member is arranged to be inclined toward the center side of the moving body in the front-rear direction of the moving body toward a lower side of the moving body in the upper-lower direction with respect to the external world information acquisition surface.

According to (4), since the external world information acquisition device is arranged at a front portion or a rear portion of the moving body, and the cover member is arranged to be inclined toward the center side of the moving body in the front-rear direction of the moving body toward the lower side of the moving body in the upper-lower direction with respect to the external world information acquisition surface, the outer shell member can have a shape which is curved toward the center side of the moving body in the front-rear direction toward the lower side of the moving body in the upper-lower direction without forming a useless space between the outer shell member and the cover member. Therefore, the outer shell member can have a shape with less air resistance when the moving body travels without forming the useless space between the outer shell member and the cover member.

(5) The moving body according to any one of (1) to (4), in which:

the outer shell member is formed with an inner protruding portion (inner protruding portion 153) which extends in a tubular shape from an outer edge of the opening portion toward the inner side of the moving body;

the cover member covers the inner protruding portion on the inner side of the moving body than the inner protruding portion of the outer shell member; and a gap portion (gap portion 60) is formed between the cover member and a protruding end portion (protruding end portion 153a) of the inner protruding portion.

According to (5), since the gap portion is formed between the cover member and the protruding end portion of the inner protruding portion, even when a flying object from the outer side of the moving body enters the inner protruding portion from the opening portion of the outer shell member, the flying object is discharged to an outer portion of the inner protruding portion from the gap portion without being deposited on the inner protruding portion. As a result, it is possible to prevent the flying object from the outer portion of the moving body from being deposited on the inner protruding portion of the outer shell member and becoming an obstacle when the external world information acquisition device acquires the external world information.

(6) The moving body according to any one of (1) to (5), in which:

the cover member is fixed to the moving body to be able to change an angle in the upper-lower direction and/or the left-right direction;

the moving body further includes, an angle changing device (angle changing device 70) configured to change the angle of the cover member in the upper-lower direction and/or the left-right direction, and a moving state detection unit (vehicle sensor 93) configured to detect a moving state of the moving body; and the angle changing device changes the angle of the cover member in the upper-lower direction and/or the left-right direction based on the moving state of the moving body detected by the moving state detection unit.

According to (6), since the angle changing device changes the angle of the cover member in the upper-lower direction and/or the left-right direction based on the moving state of the moving body detected by the moving state detection unit, the cover member can change the angle in the upper-lower direction and/or the left-right direction based on the moving state of the moving body. As a result, when the external world information is acquired by the external world information acquisition device, even when the target area, which is the area of the external world to be preferentially acquired in the autonomous movement of the moving body, changes in accordance with the moving state of the moving body, the external world information acquisition device can accurately acquire the external world information of the target area.

(7) The moving body according to (6), in which:

the moving state detection unit includes a turning direction detection unit (turning direction detection sensor 933) configured to detect a turning direction of the moving body; and the angle changing device changes the angle of the cover member in the upper-lower direction and/or the left-right direction based on the turning direction of the moving body detected by the turning direction detection unit.

According to (7), since the angle changing device changes the angle of the cover member in the upper-lower direction and/or the left-right direction based on the turning direction of the moving body detected by the turning direction detection unit, the cover member can change the angle in the upper-lower direction and/or the left-right direction based on the turning direction of the moving body. As a result, when the external world information is acquired by the external world information acquisition device, even when the target area, which is the area of the external world to be preferentially acquired in the autonomous movement of the moving body, changes in accordance with the turning direction of the moving body, the external world information acquisition device can accurately acquire the external world information of the target area.

(8) The moving body according to (6), in which:

the moving state detection unit includes an acceleration detection unit (acceleration sensor 932) configured to detect an acceleration of the moving body in the front-rear direction and/or the left-right direction; and the angle changing device changes the angle of the cover member in the upper-lower direction and/or the left-right direction based on the acceleration of the moving body in the front-rear direction and/or the left-right direction detected by the acceleration detection unit.

According to (8), since the angle changing device changes the angle in the upper-lower direction and/or the left-right direction of the cover member based on the acceleration of the moving body in the front-rear direction and/or the left-right direction detected by the acceleration detection unit, the cover member can change the angle in the upper-lower direction and/or the left-right direction based on the acceleration of the moving body in the front-rear direction and/or the left-right direction. As a result, when the external world information is acquired by the external world information acquisition device, even when the target area, which is the area of the external world to be preferentially acquired in the autonomous movement of the moving body, changes in accordance with the acceleration of the moving body in the front-rear direction and/or the left-right direction, the external world information acquisition device can accurately acquire the external world information of the target area.

(9) The moving body according to (8), in which:

the acceleration detection unit detects at least an acceleration of the moving body in the front-rear direction; and the angle changing device changes the angle of the cover member in the upper-lower direction and/or the left-right direction based on the acceleration of the moving body in the front-rear direction detected by the acceleration detection unit.

According to (9), since the angle changing device changes the angle of the cover member in the upper-lower direction and/or the left-right direction based on the acceleration of the moving body in the front-rear direction detected by the acceleration detection unit, the cover member can change the angle in the upper-lower direction and/or the left-right direction based on the acceleration of the moving body in the front-rear direction. As a result, when the external world information is acquired by the external world information acquisition device, even when the target area, which is the area of the external world to be preferentially acquired in the autonomous movement of the moving body, changes in accordance with the acceleration of the moving body in the front-rear direction, the external world information acquisition device can accurately acquire the external world information of the target area. For example, in a case where the moving body is moving in a forward direction at a high acceleration, a farther side becomes the target area, and the angle changing device can change the angle of the cover member in the upper-lower direction and/or the left-right direction, so that the external world information of the target area farther away can be accurately acquired. In addition, for example, in a case where the moving body is moving at a rearward direction acceleration (deceleration state or the like), a near side and a lateral side become the target area, and the angle changing device can change the angle of the cover member in the upper-lower direction and/or the left-right direction, so that the external world information of the target area on the near side and the lateral side can be accurately acquired.

What is claimed is:

1. A moving body comprising:

an external world information acquisition device, wherein:

the moving body is autonomously movable based on external world information acquired by the external world information acquisition device;

the external world information acquisition device is arranged on an inner side of the moving body closer than an outer shell member of the moving body;

the external world information acquisition device is formed with an external world information acquisition surface configured to acquire the external world information on a surface facing an outer side of the moving body, the external world information acquisition surface having a planar shape;

the outer shell member has an opening portion formed at a position where the opening portion overlaps at least a part of the external world information acquisition surface as viewed from the outer side of the moving body;

the moving body includes a cover member which is provided between the external world information acquisition device and the opening portion;

the external world information acquisition surface acquires the external world information via the cover member; and the cover member has a flat plate shape, and is arranged to face the external world information acquisition surface, and to be inclined in an upper-lower direction and a left-right direction of the moving body with respect to the external world information acquisition surface.

2. The moving body according to claim 1, wherein:

the external world information acquisition device is arranged at a front portion or a rear portion of the moving body, and is arranged to be offset in the left-right direction from a center of the moving body in the left-right direction.

3. The moving body according to claim 1, wherein:
the external world information acquisition device is arranged at a front portion or a rear portion of the moving body; and
the cover member is arranged be inclined toward a center side of the moving body in a front-rear direction of the moving body toward the outer side of the moving body in the left-right direction with respect to the external world information acquisition surface.

4. The moving body according to claim 1, wherein:
the external world information acquisition device is arranged at a front portion or a rear portion of the moving body; and
the cover member is arranged to be inclined toward a center side of the moving body in a front-rear direction of the moving body toward a lower side of the moving body in the upper-lower direction with respect to the external world information acquisition surface.

5. The moving body according to claim 1, wherein:
the outer shell member is formed with an inner protruding portion which extends in a tubular shape from an outer edge of the opening portion toward the inner side of the moving body;
the cover member covers the inner protruding portion on the inner side of the moving body than the inner protruding portion of the outer shell member; and
a gap portion is formed between the cover member and a protruding end portion of the inner protruding portion.

6. The moving body according to claim 1, wherein:
the cover member is fixed to the moving body to be able to change an angle in the upper-lower direction and/or the left-right direction;
the moving body further includes,
an angle changing device configured to change an angle of the cover member in the upper-lower direction and/or the left-right direction, and
a moving state detection unit configured to detect a moving state of the moving body; and
the angle changing device changes the angle of the cover member in the upper-lower direction and/or the left-right direction based on the moving state of the moving body detected by the moving state detection unit.

7. The moving body according to claim 6, wherein:
the moving state detection unit includes a turning direction detection unit configured to detect a turning direction of the moving body; and
the angle changing device changes the angle of the cover member in the upper-lower direction and/or the left-right direction based on the turning direction of the moving body detected by the turning direction detection unit.

8. The moving body according to claim 6, wherein:
the moving state detection unit includes an acceleration detection unit configured to detect an acceleration of the moving body in a front-rear direction and/or the left-right direction; and
the angle changing device changes the angle of the cover member in the upper-lower direction and/or the left-right direction based on the acceleration of the moving body in the front-rear direction and/or the left-right direction detected by the acceleration detection unit.

9. The moving body according to claim 8, wherein:
the acceleration detection unit detects at least an acceleration of the moving body in the front-rear direction; and
the angle changing device changes the angle of the cover member in the upper-lower direction and/or the left-right direction based on the acceleration of the moving body in the front-rear direction detected by the acceleration detection unit.

* * * * *